United States Patent
Hirabayashi (10) Patent No.: US 9,624,892 B2
(45) Date of Patent: Apr. 18, 2017

(54) ENGINE STARTING APPARATUS

(71) Applicant: DENSO CORPORATION, Kariya, Aichi-pref (JP)

(72) Inventor: Takashi Hirabayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 53 days.

(21) Appl. No.: 14/694,469

(22) Filed: Apr. 23, 2015

(65) Prior Publication Data

US 2015/0308397 A1 Oct. 29, 2015

(30) Foreign Application Priority Data

Apr. 23, 2014 (JP) ................. 2014-089194

(51) Int. Cl.
*F02N 11/08* (2006.01)
*H02P 7/06* (2006.01)

(52) U.S. Cl.
CPC ........ *F02N 11/0814* (2013.01); *F02N 11/087* (2013.01); *H02P 7/06* (2013.01); *F02N 2011/0892* (2013.01); *F02N 2300/102* (2013.01); *F02N 2300/104* (2013.01); *F02N 2300/2002* (2013.01); *F02N 2300/2011* (2013.01); *Y02T 10/48* (2013.01)

(58) Field of Classification Search
CPC ............... F02N 11/0814; F02N 11/087; F02N 2300/104; F02N 2011/0892; F02N 2300/102; F02N 2300/2011; H02P 29/00; H02P 7/06; H02K 41/035
USPC ..................... 290/38 R, 38 C, 38 B
See application file for complete search history.

(56) References Cited

U.S. PATENT DOCUMENTS

| | | | | |
|---|---|---|---|---|
| 4,122,354 A | * | 10/1978 | Howland ................ | F02N 11/04 123/179.3 |
| 4,731,543 A | * | 3/1988 | Buetemeister ........ | F02N 11/087 290/38 R |
| 5,892,421 A | * | 4/1999 | Matsushima .......... | F02N 11/00 290/38 R |
| 2004/0123587 A1 | * | 7/2004 | Kamiya ............. | F02D 41/0235 60/284 |
| 2004/0168664 A1 | * | 9/2004 | Senda ................... | F02N 11/087 123/179.3 |
| 2008/0211235 A1 | * | 9/2008 | Labbe ................ | F02N 11/0859 290/38 R |
| 2009/0267553 A1 | * | 10/2009 | Labbe ................ | F02N 11/0851 318/430 |
| 2012/0104769 A1 | * | 5/2012 | Wanner .............. | F02N 11/0851 290/38 C |

FOREIGN PATENT DOCUMENTS

| | | | |
|---|---|---|---|
| JP | 03000970 A | * | 1/1991 |
| JP | 2004197719 A | | 7/2004 |

* cited by examiner

*Primary Examiner* — Viet Nguyen
(74) *Attorney, Agent, or Firm* — Oliff PLC (57) ABSTRACT

An apparatus for starting an engine, capable of switching output characteristics of a starter without an electronic control unit (ECU) controlling field current flowing through field coils. The apparatus includes a starter including a wound-field-type brushed direct current (DC) motor, a bypass path electrically connected in parallel with at least part of field coils of the motor, and a switch provided along the bypass path and configured to render the bypass path conducting or non-conducting.

14 Claims, 6 Drawing Sheets

ENGINE STARTING APPARATUS

CROSS-REFERENCE TO RELATED APPLICATION

This application is based on and claims the benefit of priority from earlier Japanese Patent Applications No. 2014-89194 filed Apr. 23, 2014, the descriptions of which are incorporated herein by reference.

BACKGROUND

Technical Field

The present invention relates to an engine starting apparatus capable of switching output characteristics of a starter including a wound-field-type brushed direct current (DC) motor.

Related Art

Conventionally, there is a desire for an idle-stop-enabled starter to reduce an engine restarting time as much as possible to improve the comfort of a driver or other occupants of a vehicle. A technique for reducing the restarting time includes increasing a cranking speed. Such a technique, however, in combination with good start-up performance at low temperatures where engine friction is high, necessitates use of a large in size and high power motor.

A known technique for increasing the cranking speed at restarting of the engine without increasing dimensions of the motor includes switching as needed between high-speed and high-torque characteristics.

For example, Japanese Patent Application Laid-Open Publication No. 2004-197719 discloses preparing a motor including a series coil and a shunt coil as field coils and switching between the high-speed and high-torque characteristics by an electronic control unit (ECU) controlling field current flowing through the shunt coil of the motor.

However, the technique as disclosed in Japanese Patent Application Laid-Open Publication No. 2004-197719 necessitates an energization current of a few amps to tens of amps to pass the current through the shunt coil, which leads to an increased cost of the ECU to control such a large current. Thus, an advantage of using a low cost brushed direct current (DC) motor may be diminished.

In consideration of the foregoing, exemplary embodiments of the present invention are directed to providing an engine starting apparatus capable of switching output characteristics of a starter with low cost without an electronic control unit (ECU) controlling field current flowing through field coils.

SUMMARY

In accordance with an exemplary embodiment of the present invention, there is provided an apparatus for starting an engine, including: a starter including a wound-field-type brushed direct current (DC) motor: a bypass path electrically connected in parallel with at least part of field coils of the motor; and a switch provided along the bypass path and configured to render the bypass path conducting or non-conducting.

In the above embodiment, for example, assuming that a resistance of the bypass path and a resistance of the part of the field coils bypassed by the bypass path are equivalent to each other, when the switch renders the bypass path conducting, the bypass path and the bypassed part of the field coils share the same current. Accordingly, field power generated by the field coils is reduced, which provides a high-speed characteristic of the starter.

When the switch then renders the bypass path non-conducting, the field power generated by the field coils is increased because no current flows through the bypass path, which provides a high-torque characteristic of the starter. With this configuration, controlling the field current flowing through the field coils necessitates no use of an expensive electronic control unit (ECU), which allows the output characteristic of the starter to be switched with lower cost.

DESCRIPTION OF SPECIFIC EMBODIMENTS

The present invention will be described more fully hereinafter with reference to the accompanying drawings.

First Embodiment

An engine starting apparatus 1 in accordance with a first embodiment of the present invention includes means for variably setting the output-characteristic of a starter (described later) configured to switch as appropriate between high-speed and high-torque characteristic of a starter.

Figure 1:
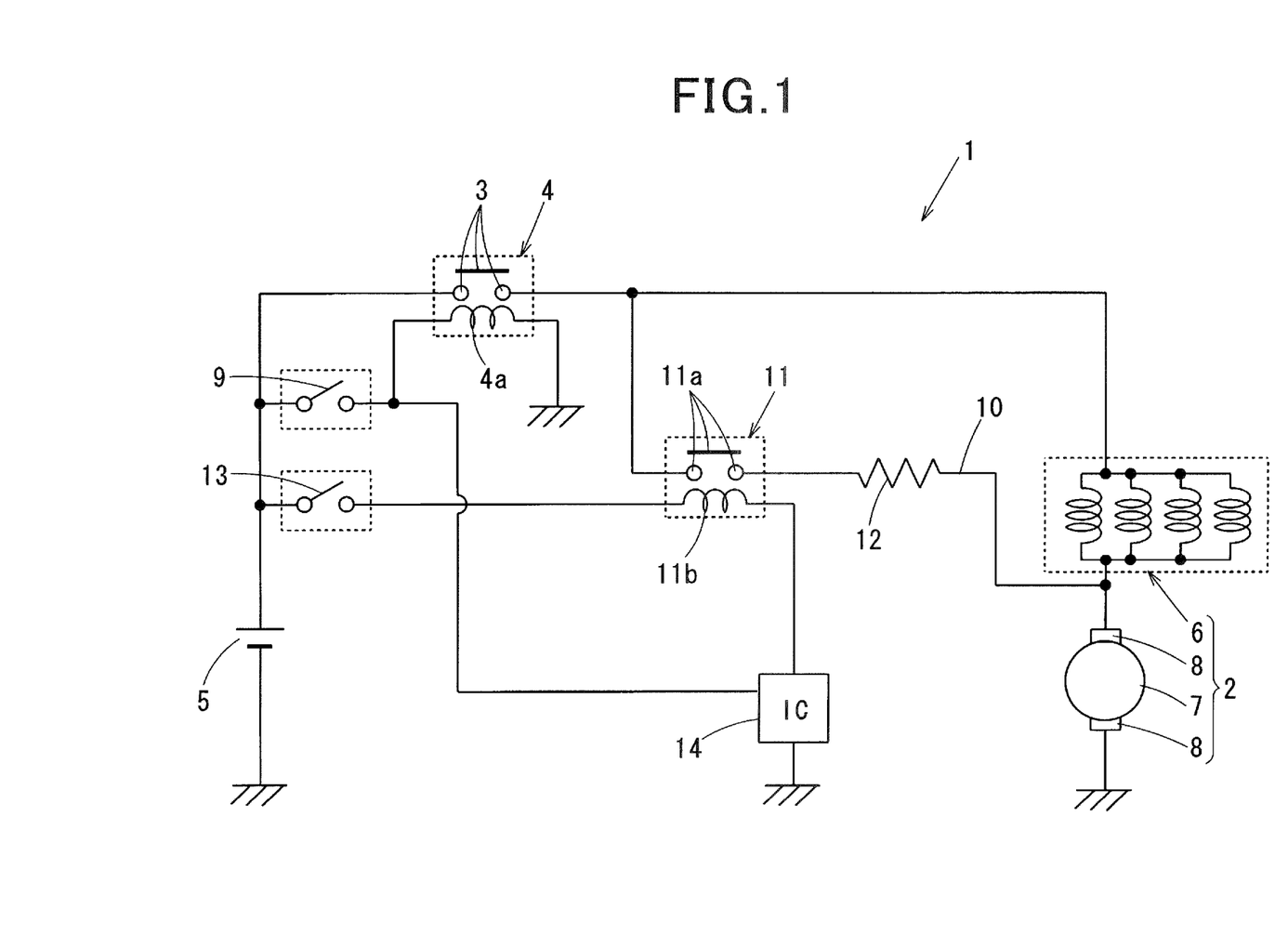
FIG. 1 is a schematic circuit diagram of an engine starting apparatus in accordance with a first embodiment of the present invention.

The starter, as shown in FIG. 1, includes a motor 2 configured to generate a rotational force, a pinion (not shown) configured to transfer the rotational force of the motor 2 to a ring gear connected to an engine, an electromagnetic switch 4 configured to open and close main contacts 3 provided in an energization circuit of the motor 2, and others. The energization circuit of the motor 2 is a power-supply line though which electrical power is supplied from a battery 5 to the motor 2 when the main contacts 3 are closed.

The motor 2 is a wound-field-type brushed direct current (DC) motor including a field element configured to generate a magnetic field through energization of the field coils 6, an armature 7 having a commutator on its axis, brushes 8 configured to slide on the commutator 7 as the armature 7 rotates, and others. As shown in FIG. 1, the motor 2 of the first embodiment is a DC series motor configured such that the field coils 6 are electrically connected in series with an armature coil (not shown).

The electromagnetic switch 4 includes a switch coil 4a electrically connected to the battery 5 through a first starter relay 9. When the first starter relay 9 is turned on, the switch coil 4a is energized by the battery 5. The main contacts 3 are thereby closed.

Means for variably setting the output-characteristic of the starter includes, as shown in FIG. 1, a bypass path 10 for bypassing the entirety of the field coils 6 to be connected in series with the armature coil, and a switch 11 configured to switch between a conducting state and a non-conducting state of the bypass path 10. A resistor 12 having a predetermined resistance is provided along the bypass path 10. Instead of providing the resistor 12, the bypass path 10 may have an interconnection resistance equivalent to the resistance of the resistor 12.

The switch 11 includes relay contacts 11a provided along the bypass path 10 and a relay coil 11b for opening or closing the relay contacts 11a in response to an on/off operation of an electromagnet. The switch 11 is a normally open relay such that the relay contacts 11a are open while the relay coil 11b is not energized and closed while the relay coil 11b is energized. That is, the switch 11 is configured to render the bypass path 10 conducting by closing the relay contacts 11a and non-conducting by the opening the relay contacts 11a.

One end of the relay coil 11b is electrically connected to the battery 5 through a second starter relay 13, and the other end of the relay coil 11b is electrically connected to timer circuit 14.

The timer circuit 14, which is an integrated circuit (IC), is electrically connected to the battery 5 through the first starter relay 9. When the first starter relay 9 is turned on, the timer circuit 14 starts counting. The timer circuit 14 is able to control energization/de-energization of the relay coil 11b. For example, the timer circuit 14 starts counting at the same time as the second starter relay 13 is turned on and energization of the relay coil 11b is thereby initiated. Thereafter, the relay coil 11b is de-energized when a predetermined amount of time has elapsed. The opening and closing of the first starter relay 9 and the second starter relay 13 are controlled by an electronic control unit (ECU) (not shown).

Advantages

In the first embodiment, the bypass path 10 bypasses the entirety of the field coils 6 and is electrically connected to an energization circuit of the motor 2, which allows the output characteristic of the starter to be switched in response to the switching operation of the switch 11 provided along the bypass path 10. For example, assuming that the resistance of the bypass path 10 including the resistor 12 and the resistance of the field coils 6 bypassed by the bypass path 10 are equivalent to each other, when the switch 11 renders the bypass path 10 conducting, the bypass path 10 and the field coils 6 share the same current. Accordingly, field power generated by the field coils 6 is reduced, which provides the high-speed characteristic. Particularly, in the first embodiment, the bypass path 10 bypasses not part, but the entirety of the field coils 6. This allows the field power generated by the field coils 6 while the bypass path 10 is conducting to be significantly reduced.

The field power generated by the field coils 6 while the bypass path 10 is conducting can be reduced by reducing the resistance of the bypass path 10. For example, when the resistance of the bypass path 10 is equal to ½ of the resistance of the field coils 6, the current flowing through the field coils 6 while the bypass path 10 is conducting is ⅓ of the total current flowing through the energization circuit of the motor 2. Accordingly, the field power generated by the field coils 6 while the bypass path 10 is conducting is reduced to ⅓, which provides a higher-speed characteristic. When the switch 11 is turned off to render the bypass path 10 non-conducting, the field power generated by the field coils 6 is increased, which provides the high-torque characteristic.

With this configuration, the field current flowing through the field coils 6 does not have to be controlled by using the expensive ECU, and can be controlled by the switching operation of the switch 11 alone. Therefore, the output characteristic of the starter can be switched with lower cost as compared to the technique as disclosed in Japanese Patent Application Laid-Open Publication No. 2004-197719.

The starter of the first embodiment is configured such that the output characteristic of the starter is switched to the high-speed characteristic by the switch 11 rendering the bypass path 10 conducting and switched to the high-torque characteristic by the switch 11 rendering the bypass path 10 non-conducting. With this configuration, in the event of a malfunction or conduction defect of the switch 11, the output characteristic of the starter is the high-torque characteristic. This allows the engine to be normally started even under a low temperature condition with high engine friction, which provides a high-safety engine starting apparatus.

In a comparative example where the bypass path 10 is electrically connected in parallel with both the field coils 6 and the armature coil, the resistance of the bypass path 10 has to be set lest the value of the current flowing through the armature coil while the bypass path 10 is conducting be so reduced that the motor 2 cannot rotate. More specifically, the resistance of the bypass path 10 needs to be much greater than a sum of the resistance of the field coils 6 and the resistance of the armature coil. However, too great resistance of the bypass path 10 will lead to a reduced value of current following through the bypass path 10 while the bypass path 10 is conducting, which will lead to a small output-characteristic change that occurs when the bypass path 10 is switched between conducting and non-conducting.

In contrast, in the first embodiment, the bypass path 10 bypasses only the field coils 6 to be electrically connected in series with the armature coil. With this configuration, the value of current flowing through the armature coil remains unchanged whether the bypass path 10 is conducting or non-conducting. This allows the resistance of the bypass path 10 to be much reduced, thereby allowing the output characteristic to more significantly change when the bypass path 10 is switched between conducting and non-conducting states.

Other embodiments of the present invention will now be explained with reference to the accompanying drawings. Elements having the same functions as in the first embodiment are assigned the same numbers and will not be described again, for brevity.

Second Embodiment

Figure 2:
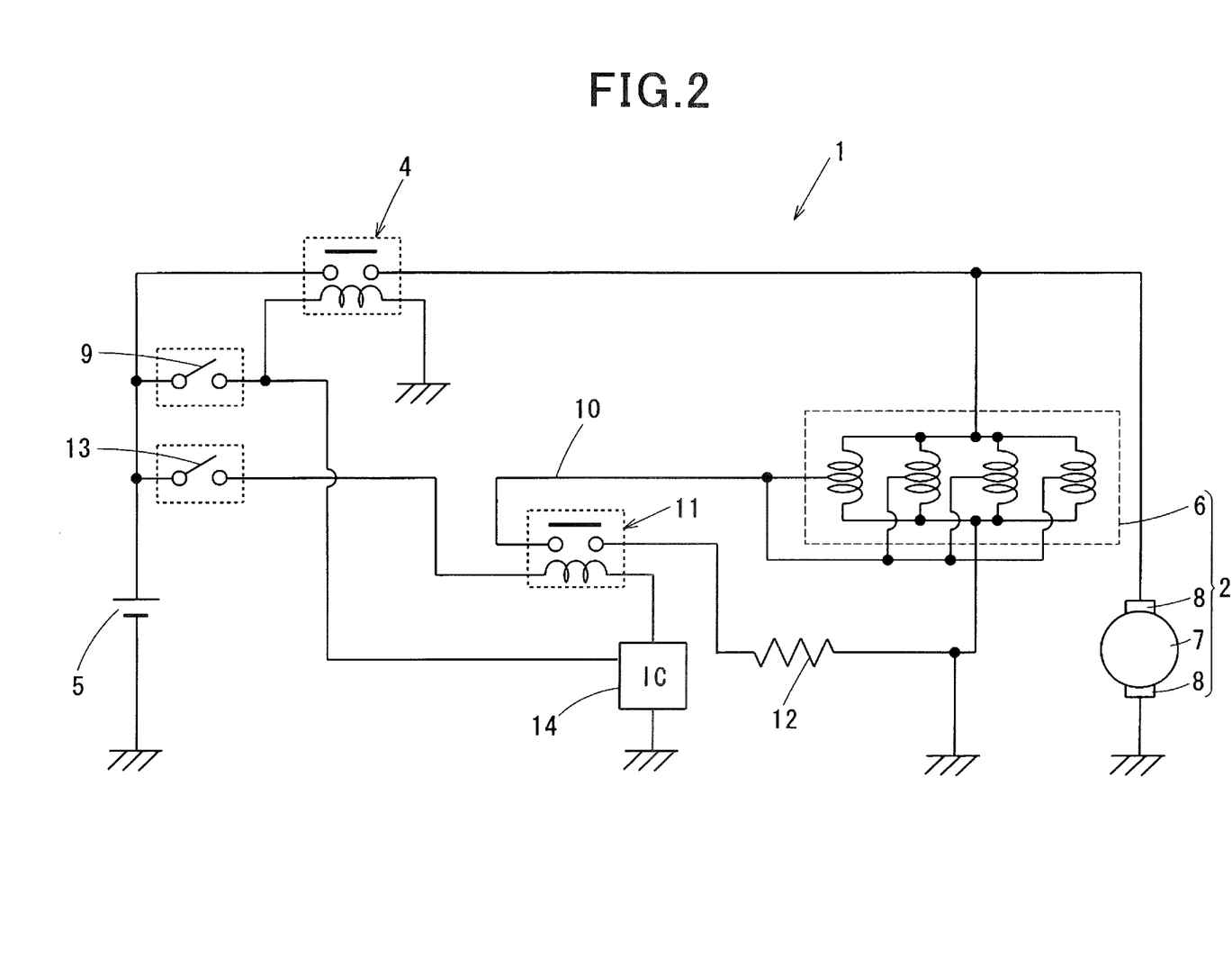
FIG. 2 is a schematic circuit diagram of an engine starting apparatus in accordance with a second embodiment of the present invention.

A second embodiment of the present invention will now be explained. As shown in FIG. 2, a bypass path 10 bypasses a fractional number of turns of each of the field coils 6 for the respective whole field poles.

In a circuit configuration shown in FIG. 2, the resistance of the bypass path 10 including the resistor 12 is set substantially equal to zero ohms (Ω). This can provide changes in output characteristic when the bypass path 10 is switched between conducting and non-conducting states which are substantially equal to changes in output characteristic when the number of turns of each of the field coils 6 for the respective whole field poles is switched between two different numbers of turns of the field coil 6.

FIG. 2 shows the circuit configuration of the shunt-wound motor 2. Alternatively, such a circuit configuration is applicable to the series-wound motor, where the bypass path 10 bypasses a fractional number of turns of each of the series coils for the respective whole field poles. Still alternatively, such a circuit configuration is applicable to a complex-wound motor having series- and shunt-wound coils, where the bypass path 10 bypasses a fractional number of turns of each of the series coils for the respective whole field poles.

Third Embodiment

Figure 3:
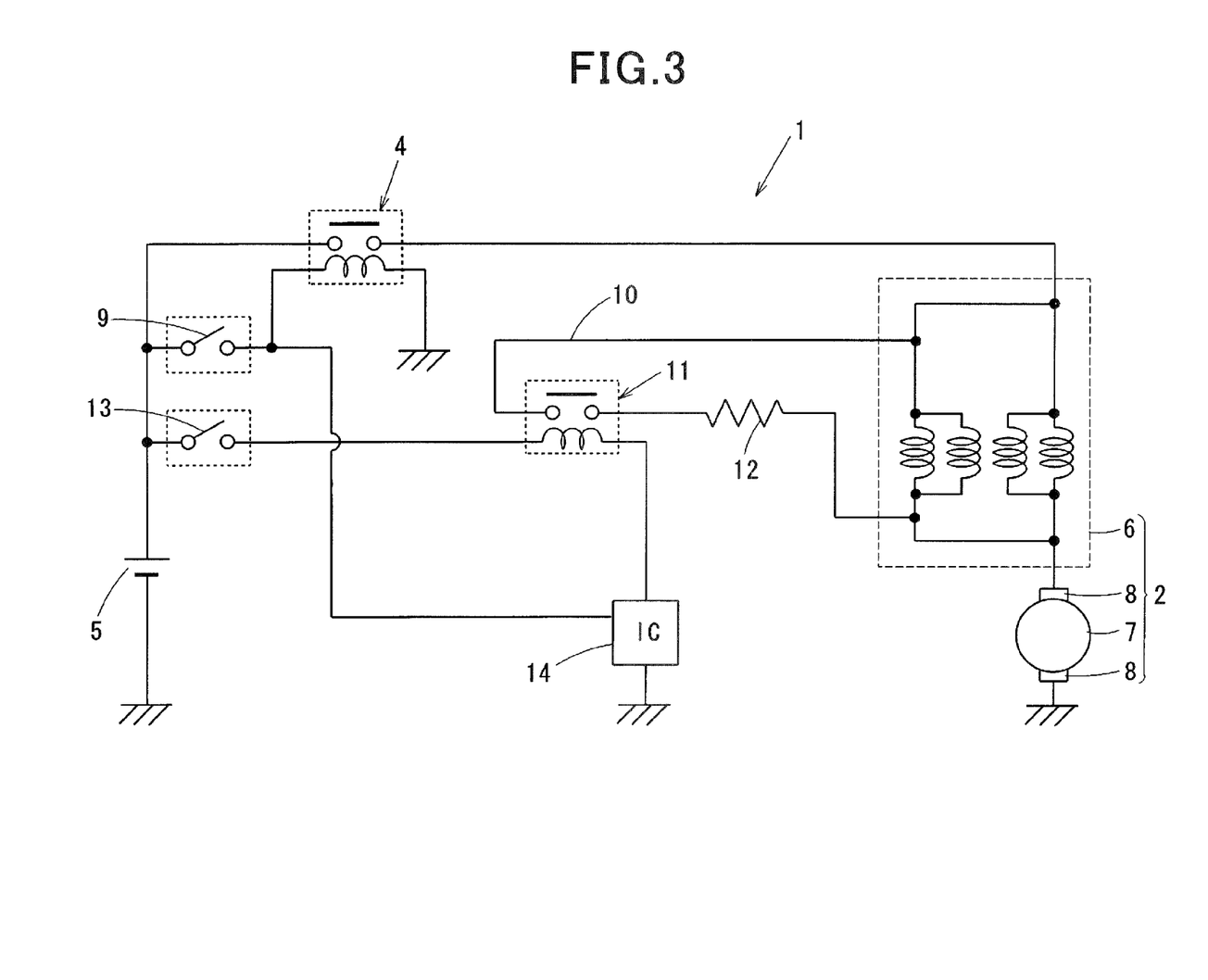
FIG. 3 is a schematic circuit diagram of an engine starting apparatus in accordance with a third embodiment of the present invention.

As shown in FIG. 3, a third embodiment is applicable to a series-wound motor 2 with four or more field poles. A bypass path 10 bypasses field coils 6 for at least one pair of field poles, where one pair of field poles include a pair of north and south poles.

In such a circuit configuration as shown in FIG. 3, for example, the number of poles can be switched between four and two when the bypass path 10 is switched between conducting and non-conducting states.

Fourth Embodiment

Figure 4:
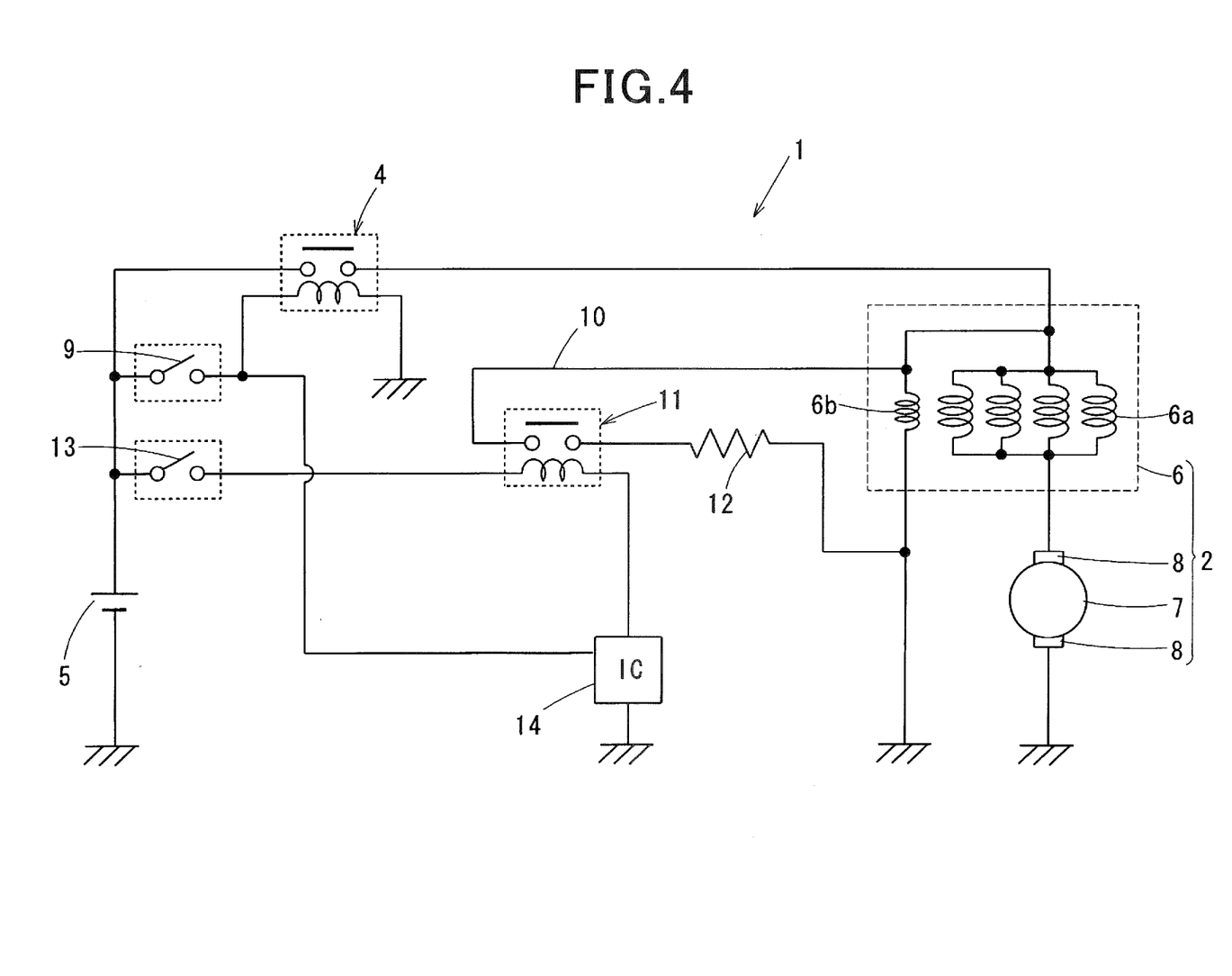
FIG. 4 is a schematic circuit diagram of an engine starting apparatus in accordance with a fourth embodiment of the present invention.

As shown in FIG. 4, a fourth embodiment is applicable to a complex-wound motor 2 with field coils 6 including four series coils 6a and one shunt coil 6b. A bypass path 10 bypasses the shunt coil 6b.

In such a circuit configuration as shown in FIG. 4, the output characteristic of the starter can be switched between a complex-wound output characteristic and an output characteristic approximately equal to a series-wound output characteristic when the bypass path 10 is switched between conducting and non-conducting states.

Fifth Embodiment

A fifth embodiment is applicable to a vehicle with an idle-stop system (ISS) or an automated stop and go system, In such a vehicle, the output characteristic of the starter can be switched between an output characteristic during cranking of the engine when the engine is restarted by the ISS and an output characteristic during cranking of the engine when the engine is started by a driver's starting operation. In the driver's starting operation, for example, the driver manually operates an engine key inserted in a key cylinder or a start button or the like to start the engine.

In the fifth embodiment, the bypass path 10 is switched between conducting and non-conducting states such that, when the engine is restarted by the ISS, the output characteristic of the starter during cranking of the engine is the high-speed characteristic, and when the engine is started by a driver's starting operation alone, the output characteristic during cranking of the engine is the high-torque characteristic.

For example, in the circuit configuration (see FIG. 1) described regarding the first embodiment, when the engine is restarted by the ISS, the bypass path 10 is put in the conducting state by the switch 11. This allows the engine to be cranked with the high-speed characteristic, which leads to a reduced latency at restarting of the engine.

When the engine is started by a driver's starting operation alone, the bypass path 10 is put in the non-conducting state by the switch 11. This allows the engine to be cranked with the high-torque characteristic, which can achieve reliable engine start in a wide temperature range from low to high temperatures.

Sixth Embodiment

In a sixth embodiment, the operation of the switch 11 is controlled by the timer circuit 14 such that, when the output characteristic of the starter is the high-speed characteristic at a predetermined elapsed time after the initiation of energization of the motor 2, the output characteristic of the starter is thereafter switched from the high-speed characteristic to the high-torque characteristic.

For example, if the engine start cannot be completed in a short time due to unexpected high engine friction at restarting of the engine from the idle stop state, it is likely that the engine is unable to be started due to under-torque. Referring to the timing chart of FIG. 5, energization of the electromagnetic switch 4 is initiated at time t1 along the time axis (abscissa axis). After energization of the motor 2 is initiated at time t2, the pinion successfully meshes with the ring gear at time t3.

Figure 5:
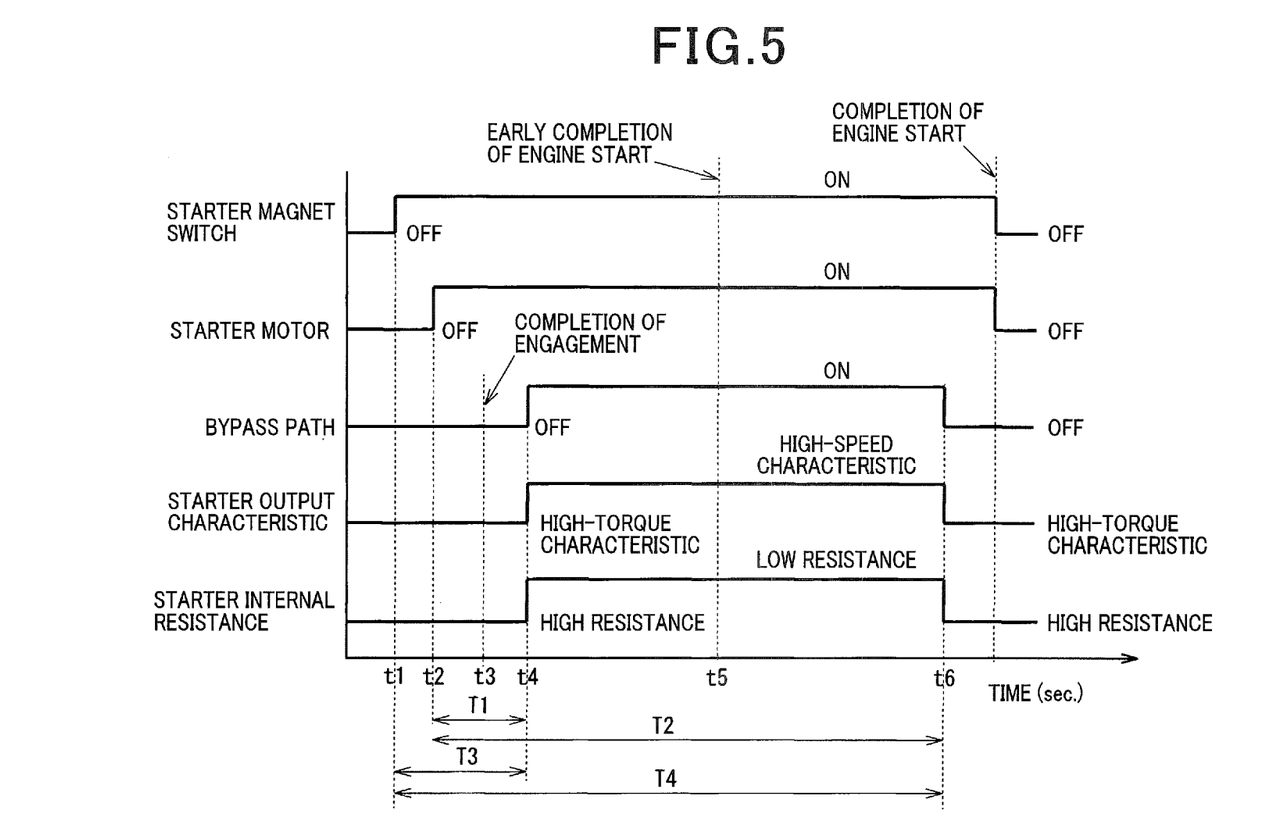
FIG. 5 is a timing chart for explaining the operation of an engine starting apparatus in accordance with each of first to twelfth embodiments of the present invention.

Thereafter, in the absence of torque deficit or the like, the engine restart will be completed at time t5. When the engine start cannot be completed at time t5, the bypass path 10 is rendered non-conducting by the switch 11 at time t6. Thus, the output characteristic of the starter is switched from the high-speed characteristic to the high-torque characteristic, which can eliminate the torque deficit, thereby allowing the engine to be successfully restarted.

An amount of time from the idle stop state to the completion of engine restart is generally about 0.4 seconds. Therefore, when the engine restart cannot be completed at time t5, the bypass path 10 is rendered non-conducting by the switch 11 at an elapsed time of 0.5 to 2 seconds after the initiation of energization of the motor 2. In a case where the initiation of energization of the motor 2 cannot be detected, the bypass path 10 may be rendered non-conducting by the switch 11 at an elapsed time of 0.5 to 2 seconds after the initiation of energization of the electromagnetic switch 4.

When to render the bypass path 10 non-conducting can be controlled by the timer circuit 14. That is, as shown in FIG. 5, a time interval T2 from time t2 at which energization of the motor 2 is initiated to time t6 or a time interval T4 from time t1 at which energization of the electromagnetic switch 4 is initiated to time t6 is counted by the timer circuit 14. When time t6 is reached, the bypass path 10 is rendered non-conducting by the switch 11. When the engine cannot be started in a short time not only by restart from the idle stop state, but also by the driver's starting operation, the engine can be successfully started by rapidly switching the output characteristic from the high-speed characteristic to the high-torque characteristic.

Seventh Embodiment

In a seventh embodiment, the switching operation of the switch 11 is controlled by the timer circuit 14 such that, at least until a specific amount of time elapses after the initiation of energization of the motor 2, the output characteristic of the starter is one of the high-speed characteristic and the high-torque characteristic, at which the motor resistance is greater than at the other of the high-speed characteristic and the high-torque characteristic. One of the high-speed characteristic and the high-torque characteristic, at which the motor resistance is greater, is hereinafter referred to as a high-resistance characteristic, and the other is referred to as a low-resistance characteristic.

At restarting of the engine from the idle stop state, too low motor resistance causes too large an inrush current when the engine is energized, which causes a terminal voltage of the battery 5 to drop significantly. Accordingly, various ECUs on the vehicle side may be reset, or actuation of various solenoids becomes unstable.

A known measure to reduce the inrush current upon energization of the motor includes connecting an in-rush current reduction (ICR) relay including a resistor to the energization circuit of the motor 2. Such a measure gives rise to a problem that the addition of the ICR relay may lead to increased cost. To overcome this problem, as shown in FIG. 5, the switching operation of the switch 11 is controlled by the timer circuit 14 such that the output characteristic of the starter is the high-resistance characteristic during a time interval T1 from time t2 at which energization of the motor 2 is initiated to time t4 or during a time interval T3 from time t1 at which energization of the electromagnetic switch 4 is initiated to time t4. This can suppress the inrush current since the motor resistance is high whether the output characteristic of the starter is the high-speed characteristic or the high-torque characteristic when the energization of the motor 2 is initiated. Such a technique can achieve an effect similar to when the ICR relay is used, without adding means, such as the ICR relay, for suppressing the inrush current and with low cost.

Eighth Embodiment

In an eighth embodiment, the switching operation of the switch 11 is controlled by the timer circuit 14 as follows. A specific amount of time from when the energization of the motor 2 is initiated to when the output characteristic of the starter is switched from the high-resistance characteristic to the low-resistance characteristic is determined such that a value of inrush current after the output characteristic of the starter is switched from the high-resistance characteristic to the low-resistance characteristic is less than a value of inrush current at the high-resistance characteristic of the starter.

In the vehicle-side system, whether to perform the idle stop is determined by determining whether or not a battery voltage is less than a reference value due to a greater one of two inrush current values. Therefore, such a configuration of the eighth embodiment that the switching of the bypass path 10 between the conducting and non-conducting states is controlled such that a value of inrush current after the output characteristic of the starter is switched from the high-resistance characteristic to the low-resistance characteristic is less than a value of inrush current while the output characteristic of the starter is the high-resistance characteristic can provide a maximum effect.

Ninth Embodiment

In a ninth embodiment, the starter is an inertia-engagement-type starter configured to cause the pinion to spring into the ring gear at starting of the engine, and is configured such that the motor resistance at the high-torque characteristic is greater than the motor resistance at the high-speed characteristic. In addition, the switching of the bypass path 10 between the conducting and non-conducting states is controlled such that, when the high-speed characteristic of the starter is used during cranking of the engine, the output characteristic of the starter is the high-torque characteristic at least until the pinion successfully meshes with the ring gear, and after the pinion has successfully meshed with the ring gear, the output characteristic of the starter is switched from the high-torque characteristic to the high-speed characteristic.

If the pinion meshes with the ring gear at the high-speed characteristic, a rotational speed of the pinion may become too high for the pinion to mesh with the ring gear, which reduces engagement reliability. In addition, if a starting torque of the motor 2 is too high, gear-end-face friction may increase while the pinion abuts the ring gear and rotates, which reduces durability for maintaining the engagement reliability.

Since in the ninth embodiment the output characteristic of the starter is the high-torque characteristic at least until the pinion successfully meshes with the ring gear, the rotational speed of the pinion is reduced at meshing of the pinion with the ring gear, which ensures the engagement reliability.

In addition, since the motor 2 is started with high motor resistance, the starting torque is reduced, which can reduce the gear-end-face friction between the pinion and the ring gear and can enhance the durability. Further, it is possible to achieve an effect similar to when the ICR relay or the like is used, without adding means for suppressing the inrush current and with low cost.

Tenth Embodiment

In a tenth embodiment, when to switch from the high-torque characteristic to the high-speed characteristic in the ninth embodiment is set or controlled by the timer circuit 14.

More specifically, as shown in FIG. 5, an elapsed time from the initiation of energization of the electromagnetic switch 4 (i.e., the initiation of actuation of the starter) or an elapsed time from the initiation of energization of the motor 2 is set or controlled by the timer circuit 14 such that the output characteristic of the starter is switched from the high-torque characteristic to the high-speed characteristic after the pinion successfully meshes with the ring gear. The use of the timer circuit 14 can provide an effect similar to that of the ninth embodiment.

Eleventh Embodiment

In an eleventh embodiment, an elapsed time from the initiation of energization of the motor 2 is set or controlled by the timer circuit 14 such that, the output characteristic of the starter is the high-torque characteristic when the engine starts to rotate upon receipt of torque of the motor 2 transferred from the pinion to the ring gear, and the output characteristic of the starter is switched from the high-torque characteristic to the high-speed characteristic during cranking of the engine.

This allows the torque of the starter to be efficiently transferred, which can further reduce the starting time.

Twelfth Embodiment

In a twelfth embodiment, the bypass path 10 and the switch 11 are integrated with the starter. With this configuration, a connection length between the bypass path 10 and the switch 11 can be reduced, which can downsize the engine starting apparatus 1. Both the bypass path 10 and the switch 11 don't have to be mounted on the vehicle side, which can reduce structural modifications on the vehicle side.

The timer circuit 14 is integrated with the starter, which allows the means for variably setting the output-characteristic of the starter to be integrated with the starter. Therefore, the engine starting apparatus of the present embodiment can be applied to any vehicle-side system for conventional starters without modifying the system.

Thirteenth Embodiment

Figure 6:
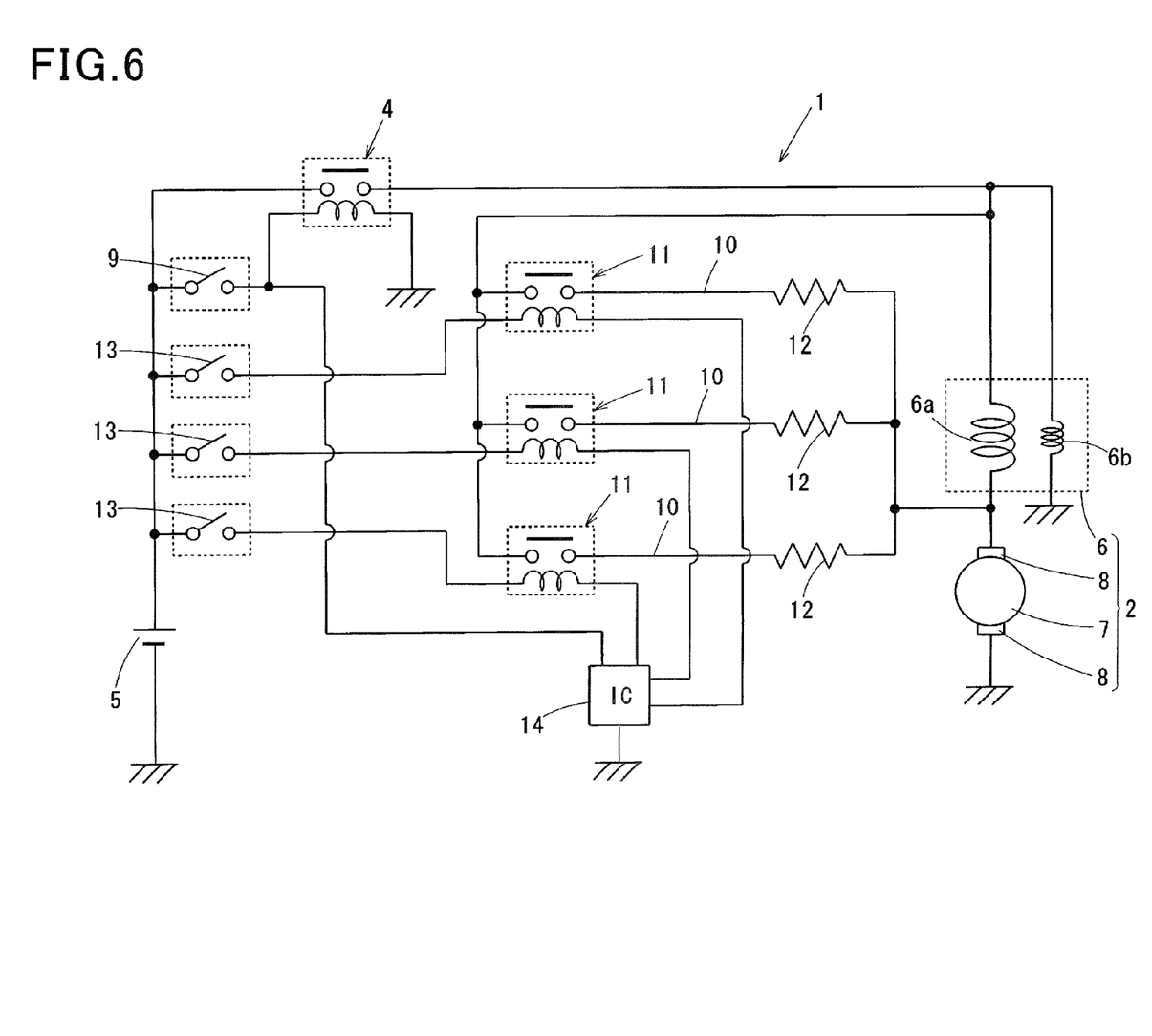
FIG. 6 is a schematic circuit diagram of an engine starting apparatus in accordance with a thirteenth embodiment of the present invention.

In a thirteenth embodiment, as shown in FIG. 6, there are provided a plurality of (e.g., three in FIG. 6) bypass paths 10 each provided with a respective one of a plurality of (e.g., three in FIG. 6) switches 11.

In such a circuit configuration, switching the number of bypass paths 10 that are simultaneously rendered conducting can provide at least one intermediate output characteristic of the starter between the highest-speed characteristic and the highest-torque characteristic. This can provide an output characteristic of the starter with which the engine can be started efficiently according to various conditions that are different in magnitude of engine friction due to outside temperatures or other factors. In addition, to reduce engine starting times, the output characteristic of the starter can be sequentially switched several times during one engine start. For example, the output characteristic may be the high-torque characteristic immediately after initiation of cranking of the engine. Thereafter, as the engine speed increases, the output characteristic of the starter may be switched to a higher-speed characteristic.

MODIFICATIONS

In each of the first to thirteenth embodiments, the engine starting apparatus 1 includes the timer circuit 14. Instead of providing the timer 14, the ECU may provide the function of the timer 14. In the ninth or tenth embodiment, the inertia-engagement-type starter is used. In the other embodiments, not only the inertia-engagement-type starter, but also, for example, a constant mesh starter may be used, where the pinion and the ring gear constantly mesh with each other.

What is claimed is:

1. An apparatus for starting an engine, comprising:
    a starter including a wound-field-type brushed direct current (DC) motor;
    a bypass path electrically connected in parallel with at least part of field coils of the motor; and
    a switch provided along the bypass path and configured to render the bypass path conducting or non-conducting,
    wherein each of the field coils includes a plurality of turns, and the bypass path is configured to, when rendered conducting by the switch, bypass less than all of the turns of each of the field coils for respective whole field poles, such that the bypass path bypasses part of each coil between one of the coil's end positions and a middle position along a winding of the coil.

2. The apparatus of claim 1, wherein
    an output characteristic of the starter is a high-speed characteristic when the bypass path is in a conducting state, and
    the output characteristic of the starter is a high-torque characteristic when the bypass path is in a non-conducting state.

3. The apparatus of claim 1, wherein
    the bypass path is switched by the switch between conducting and non-conducting states such that, when the engine of a vehicle with an idle-stop system (ISS) is restarted by the ISS,
    an output characteristic of the starter during cranking of the engine is a high-speed characteristic, and when the engine is started by a driver's starting operation alone, the output characteristic of the starter during cranking of the engine of the vehicle is a high-torque characteristic.

4. The apparatus of claim 1, further comprising a timer circuit configured to control switching operation of the switch, by which the bypass path is switched between conducting and non-conducting states, such that, when the output characteristic of the starter is the high-speed characteristic at a predetermined elapsed time after initiation of energization of the motor, the output characteristic of the starter is thereafter switched from the high-speed characteristic to the high-torque characteristic.

5. The apparatus of claim 4, wherein the output characteristic of the starter is switched from the high-speed characteristic to the high-torque characteristic at an elapsed time of 0.5 to 2 seconds after the initiation of energization of the motor.

6. The apparatus of claim 4, wherein the bypass path, the switch, and the timer circuit are integrated with the starter.

7. The apparatus of claim 1, further comprising a timer circuit configured to control switching operation of the switch, by which the bypass path is switched between conducting and non-conducting states, such that, at least until a specific amount of time elapses after initiation of energization of the motor, an output characteristic of the starter is one of a high-speed characteristic and a high-torque characteristic, at which a motor resistance is greater than at the other of the high-speed characteristic and the high-torque characteristic.

8. The apparatus of claim 7, wherein
    the one of the high-speed characteristic and the high-torque characteristic, at which the motor resistance is greater than at the other of the high-speed characteristic and the high-torque characteristic, is referred to as a high-resistance characteristic, and the other is referred to as a low-resistance characteristic,
    the specific amount of time is a time interval from when the energization of the motor is initiated to when the output characteristic of the starter is switched from the high-resistance characteristic to the low-resistance characteristic, and
    the switching operation of the switch, by which the bypass path is switched between conducting and non-conducting states, is controlled by the timer circuit such that a value of inrush current after the output characteristic of the starter is switched from the high-resistance characteristic to the low-resistance characteristic is less than a value of inrush current at the high-resistance characteristic of the starter.

9. The apparatus of claim 1, wherein
    the starter is an inertia-engagement-type starter configured to cause a pinion to spring into a ring gear at starting of the engine, and is configured such that a motor resistance at a high-torque characteristic of the starter is greater than the motor resistance at a high-speed characteristic of the starter, and
    the bypass path is switched by the switch between conducting and non-conducting states such that, when the high-speed characteristic of the starter is used during cranking of the engine, an output characteristic of the starter is the high-torque characteristic at least until the pinion successfully meshes with the ring gear, and after the pinion has successfully meshed with the ring gear, the output characteristic of the starter is switched from the high-torque characteristic to the high-speed characteristic.

10. The apparatus of claim 9, further comprising a timer circuit configured to control switching operation of the switch, by which the bypass path is switched between conducting and non-conducting states,
   wherein an elapsed time from initiation of actuation of the starter or an elapsed time from initiation of energization of the motor is set or controlled by the timer circuit such that the output characteristic of the starter is switched from the high-torque characteristic to the high-speed characteristic after the pinion successfully meshes with the ring gear.

11. The apparatus of claim 1, further comprising a timer circuit configured to control switching operation of the switch, by which the bypass path is switched between conducting and non-conducting states,
   wherein an elapsed time from initiation of energization of the motor is set or controlled by the timer circuit such that, an output characteristic of the starter is a high-torque characteristic when the engine starts to rotate upon receipt of torque of the motor transferred from a pinion to a ring gear, and the output characteristic of the starter is switched from the high-torque characteristic to a high-speed characteristic during cranking of the engine.

12. The apparatus of claim 1, wherein the bypass path and the switch are integrated with the starter.

13. An apparatus for starting an engine, comprising:
   a starter including a wound-field-type brushed direct current (DC) motor;
   a bypass path electrically connected in parallel with at least part of field coils of the motor; and
   a switch provided along the bypass path and configured to render the bypass path conducting or non-conducting, wherein
   the motor comprises four or more field poles, and
   the bypass path is configured to, when rendered conducting by the switch, bypass field coils for at least one pair of field poles, one pair of field poles including a pair of north (N) and south (S) poles of the four or more field poles.

14. An apparatus for starting an engine, comprising:
   a starter including a wound-field-type brushed direct current (DC) motor;
   a bypass path electrically connected in parallel with at least part of field coils of the motor; and
   a switch provided along the bypass path and configured to render the bypass path conducting or non-conducting, wherein
   the motor is a complex-wound motor with the field coils including at least one series coil and at least one shunt coil, and
   the bypass path is configured to, when rendered conducting by the switch, bypass the at least one shunt coil.

* * * * *